(12) United States Patent
Shalev

(10) Patent No.: US 9,513,820 B1
(45) Date of Patent: Dec. 6, 2016

(54) DYNAMICALLY CONTROLLING TEMPORARY COMPROMISE ON DATA REDUNDANCY

(71) Applicant: PURE Storage, Inc., Mountain View, CA (US)

(72) Inventor: Ori Shalev, Cupertino, CA (US)

(73) Assignee: Pure Storage, Inc., Moutain View, CA (US)

( * ) Notice: Subject to any disclaimer, the term of this patent is extended or adjusted under 35 U.S.C. 154(b) by 55 days.

(21) Appl. No.: 14/246,900

(22) Filed: Apr. 7, 2014

(51) Int. Cl.
*G06F 3/06* (2006.01)
(52) U.S. Cl.
CPC ........... *G06F 3/0614* (2013.01); *G06F 3/0644* (2013.01); *G06F 3/0689* (2013.01)
(58) Field of Classification Search
None
See application file for complete search history.

(56) References Cited

U.S. PATENT DOCUMENTS

| | | | |
|---|---|---|---|
| 5,208,813 A | 5/1993 | Stallmo | |
| 6,412,045 B1 | 6/2002 | DeKoning et al. | |
| 6,799,283 B1 | 9/2004 | Tamai et al. | |
| 6,915,434 B1 | 7/2005 | Kuroda | |
| 7,028,216 B2 | 4/2006 | Aizawa et al. | |
| 7,216,164 B1 | 5/2007 | Whitmore et al. | |
| 8,352,540 B2 | 1/2013 | Anglin et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 2002/0038436 A1 | 3/2002 | Suzuki | |
| 2003/0145179 A1* | 7/2003 | Gabber et al. | 711/162 |
| 2004/0049572 A1 | 3/2004 | Yamamoto et al. | |
| 2007/0171562 A1 | 7/2007 | Maejima et al. | |
| 2007/0220313 A1 | 9/2007 | Katsuragi et al. | |
| 2008/0059699 A1 | 3/2008 | Kubo et al. | |

(Continued)

FOREIGN PATENT DOCUMENTS

| | | |
|---|---|---|
| WO | WO-2008/102347 A1 | 8/2008 |
| WO | WO-2010/071655 A1 | 6/2010 |

OTHER PUBLICATIONS

Micosoft Coportion "GCSettings.IsSeverGC Propery", Retrieved Oct. 27, 2013 via the WayBack Machines, 3 pages.

(Continued)

*Primary Examiner* — Jared Rutz
*Assistant Examiner* — William E Baughman
(74) *Attorney, Agent, or Firm* — Edward J. Lenart; Kennedy Lenart Spraggins LLP

(57) ABSTRACT

Systems and methods for determining when to allow a temporary compromise on redundancy in a storage system. When servicing write requests, the storage system may utilize data redundancy techniques when writing data to backend storage devices. The operating conditions of the storage system are tracked and early acknowledgements for write requests may be permitted when the storage system is healthy enough. If the number of unacknowledged writes is greater than a programmable threshold, then early acknowledges may be prohibited. Also, if the number of ongoing rebuild processes is greater than a programmable threshold, then early acknowledges may be prohibited.

11 Claims, 5 Drawing Sheets

(56) References Cited

U.S. PATENT DOCUMENTS

| | | |
|---|---|---|
| 2008/0155191 A1 | 6/2008 | Anderson et al. |
| 2008/0178040 A1 | 7/2008 | Kobayashi |
| 2008/0275928 A1 | 11/2008 | Shuster |
| 2009/0204858 A1 | 8/2009 | Kawaba |
| 2009/0228648 A1 | 9/2009 | Wack |
| 2010/0067706 A1 | 3/2010 | Anan et al. |
| 2010/0250882 A1 | 9/2010 | Hutchison et al. |
| 2011/0029731 A1* | 2/2011 | Cilfone et al. ............ 711/114 |
| 2011/0208913 A1* | 8/2011 | Suzuki et al. ............ 711/115 |
| 2011/0238634 A1 | 9/2011 | Kobara |
| 2012/0023375 A1 | 1/2012 | Dutta et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0339303 A1 | 12/2013 | Potter et al. |
| 2014/0089730 A1 | 3/2014 | Watanabe et al. |
| 2014/0172929 A1 | 6/2014 | Sedayao et al. |
| 2014/0281308 A1 | 9/2014 | Lango et al. |
| 2015/0039824 A1* | 2/2015 | Furlong ............ G06F 12/0868 711/113 |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |

OTHER PUBLICATIONS

Microsoft Corporation, "Fundamentals of Garbage Collection", Retrieved Aug. 30, 2013 via the WayBack Machine, 11 pages.

\* cited by examiner

DYNAMICALLY CONTROLLING TEMPORARY COMPROMISE ON DATA REDUNDANCY

BACKGROUND

Field of the Invention

This invention relates to storage systems, and more particularly to dynamically controlling a temporary compromise on data redundancy in a storage system.

Description of the Related Art

When servicing write requests, storage systems may use data redundancy techniques when writing to backend storage devices. In one embodiment, the storage devices of a storage system may be configured in a redundant array of independent drives (RAID) arrangement for data storage and protection. For example, when writing client data blocks, a first number 'N' of data pieces may be written together with a second number 'M' of redundant data, such as parity, pieces across 'N+M' storage devices. In this way, a loss of M or fewer pieces of data can be overcome.

To ensure that a write request is not prematurely reported as successful, the storage system typically acknowledges the write request no sooner than all pieces of data and parity are successfully persisted. However, this approach may unnecessarily inhibit the performance of the storage system. In some cases, while waiting for all data and parity blocks to be written, the storage system may be prevented from performing other tasks, resulting in increased latency.

SUMMARY OF THE INVENTION

Various embodiments of systems and methods for dynamically controlling a temporary compromise on data redundancy in a storage system are contemplated.

In one embodiment, the storage system may include a storage controller and a plurality of storage devices. The storage system may utilize data redundancy techniques (e.g., RAID) for storing data across the plurality of storage devices. In one embodiment, the storage devices may include solid-state memory technology for data storage, such as Flash memory cells.

In one embodiment, the storage controller may store data of write requests with some level of redundancy. For example, when writing client data blocks, a first number 'N' of data pieces may be written to 'N' storage devices and a second number 'M' of redundant pieces may be written to 'M' storage devices, wherein 'N' and 'M' are integers. In one embodiment, the storage controller may permit a temporary compromise on redundancy by allowing early acknowledgements for write requests if the current storage system status satisfies one or more conditions. An early acknowledgment may be sent to a client for a given write request after the storage controller has received 'N–k' acknowledgments from the storage devices for successfully persisted data or parity blocks, wherein 'k' is an integer less than or equal to 'M'.

When the storage system generates an early acknowledgment, the storage system can proceed to handle additional workload without waiting for the final acknowledgments from the one or more remaining storage devices. However, in some cases, when the temporary compromise on redundancy is uncontrolled, when it occurs at a rate higher than the system is able to rebuild redundancy, then it may grow into an actual compromise on redundancy. Therefore, to prevent an uncontrolled loss of redundancy, the system may utilize a temporal redundancy control unit to determine when the system is healthy enough to generate early acknowledgments with minimal effect on the actual redundancy of data.

In one embodiment, the temporal redundancy control unit may track the total number of unacknowledged writes from storage devices of the storage system. When processing a given write request, the temporal redundancy control unit may compare the total number of unacknowledged writes to a programmable threshold. If the total number of unacknowledged writes is greater than the programmable threshold, then the temporal redundancy control unit may disallow early acknowledgments. However, if the total number of unacknowledged writes is less than the programmable threshold, then the temporal redundancy control unit may allow an early acknowledgment for the given write request.

In another embodiment, the temporal redundancy control unit may track the total number of ongoing rebuild processes. When processing a given write request, the temporal redundancy control unit may compare the total number of ongoing rebuild processes to a programmable threshold. If the total number of ongoing rebuild processes is greater than the programmable threshold, then the temporal redundancy control unit may disallow early acknowledgments. However, if the total number of ongoing rebuild processes is less than the programmable threshold, then the temporal redundancy control unit may allow an early acknowledgment for the given write request.

Additionally, the temporal redundancy control unit may track the history of specific backend storage devices. If a first storage device is determined to be relatively slower than other storage devices, then early acknowledges may be permitted when waiting on a write to the first storage device. However, early acknowledges may be prohibited when waiting on writes to relatively faster storage devices. In some cases, the issuance of early acknowledges prior to completing writes to slow devices may be contingent on the total number of unacknowledged writes and the total number of ongoing rebuild processes being lower than their corresponding thresholds.

These and other embodiments will become apparent upon consideration of the following description and accompanying drawings.

Figure 1:
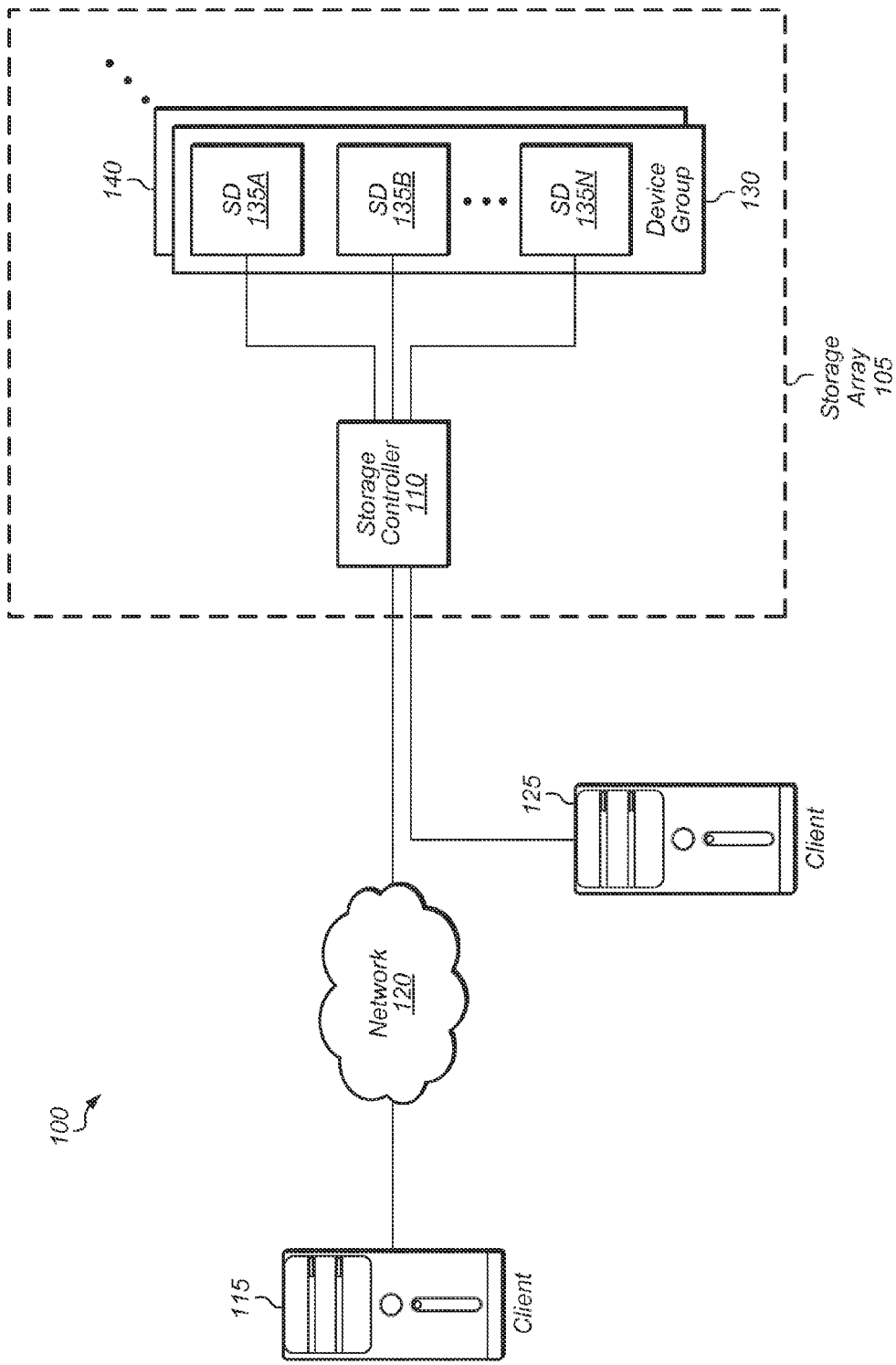
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the various embodiments might be practiced without these specific details. In some instances, well-known circuits, structures, signals, computer program instruction, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage controller . . . ." Such a claim does not foreclose the system from including additional components (e.g., network interface, memory, processor).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. As shown, storage system 100 includes storage array 105. Storage array 105 includes storage controller 110 and storage device groups 130 and 140, which are representative of any number of storage device groups (or data storage arrays). Storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may run any type of OS (e.g., Windows®, Unix®, Linux®, Solaris®, MacOS®) depending on the embodiment.

Storage controller 110 may use any of various techniques for replicating data across devices 135A-N to prevent loss of data due to the failure of a device or the failure of storage locations within a device. For example, in one embodiment, storage controller 110 may utilize a RAID technique for replicating data across the storage devices of storage array 105. The storage controller 110 may write a segment (or RAID stripe) across a plurality of storage devices, wherein each portion of the segment written to an individual storage device is referred to as a "shard" or "block". The blocks may include data and parity blocks, with the data blocks corresponding to the data being stored by a client and the parity blocks being generated from the data blocks for redundancy purposes. For example, in one embodiment, a segment may be written across 9 storage devices, with 7 of the storage devices storing data blocks and 2 of the storage devices storing parity blocks. In this embodiment, a loss of 2 or fewer blocks can be overcome by rebuilding the lost blocks. In other embodiments, storage controller 110 may be configured to write segments across other numbers of storage devices with other levels of redundancy.

Storage controller 110 may be configured to track the status of storage array 105 and determine whether to allow early acknowledgments for a given write request. An early acknowledgment may be defined as an acknowledgment which is sent to the client prior to writing all data and redundant blocks corresponding to the given write request to the storage devices. The writes of all of the data and parity blocks for a given write request may be considered "complete" when storage controller 110 has received an acknowledgment from each storage device which was assigned a data or parity block for the given write request. The acknowledgment sent from the storage device to the storage controller indicates that the data or parity block was successfully written to the storage device. For ease of discussion, redundant data will generally be described as parity herein. However, it is to be understood that redundant data refers to any data that may be used to protect or recover other data.

Storage controller 110 may receive a plurality of inputs which are utilized to evaluate the status of the storage system and determine whether to allow an early acknowledgment for a given received write request. These inputs may include notifications when 'N–k' pieces (of a total of 'N' pieces) are acknowledged by corresponding storage devices, with information on the non-acknowledged backend writes, wherein the value of 'k' may be between one and the number of parity blocks for a given write request. Also, for each non-acknowledged backend write, information regarding the associated rebuildable entity may be an input to storage controller 110. Additionally, the asynchronous result of the backend writes when they complete may be an input to storage controller 110. Still further, notifications on events of the redundancy rebuild process with the associated rebuildable entity may be inputs to storage controller 110. Based on the status of these inputs and/or one or more other operating conditions of storage array 105, storage controller 110 may determine whether to allow an early acknowledgment for a received write request.

It is noted that in alternative embodiments, the number and type of clients, storage controllers, networks, storage device groups, and data storage devices is not limited to those shown in FIG. 1. Furthermore, in various embodiments, the methods and mechanisms disclosed herein can be implemented in various networks and systems including computer systems, security systems, wireless networks, network architectures, data centers, operating systems, communication devices, and various other devices and systems.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number and type of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
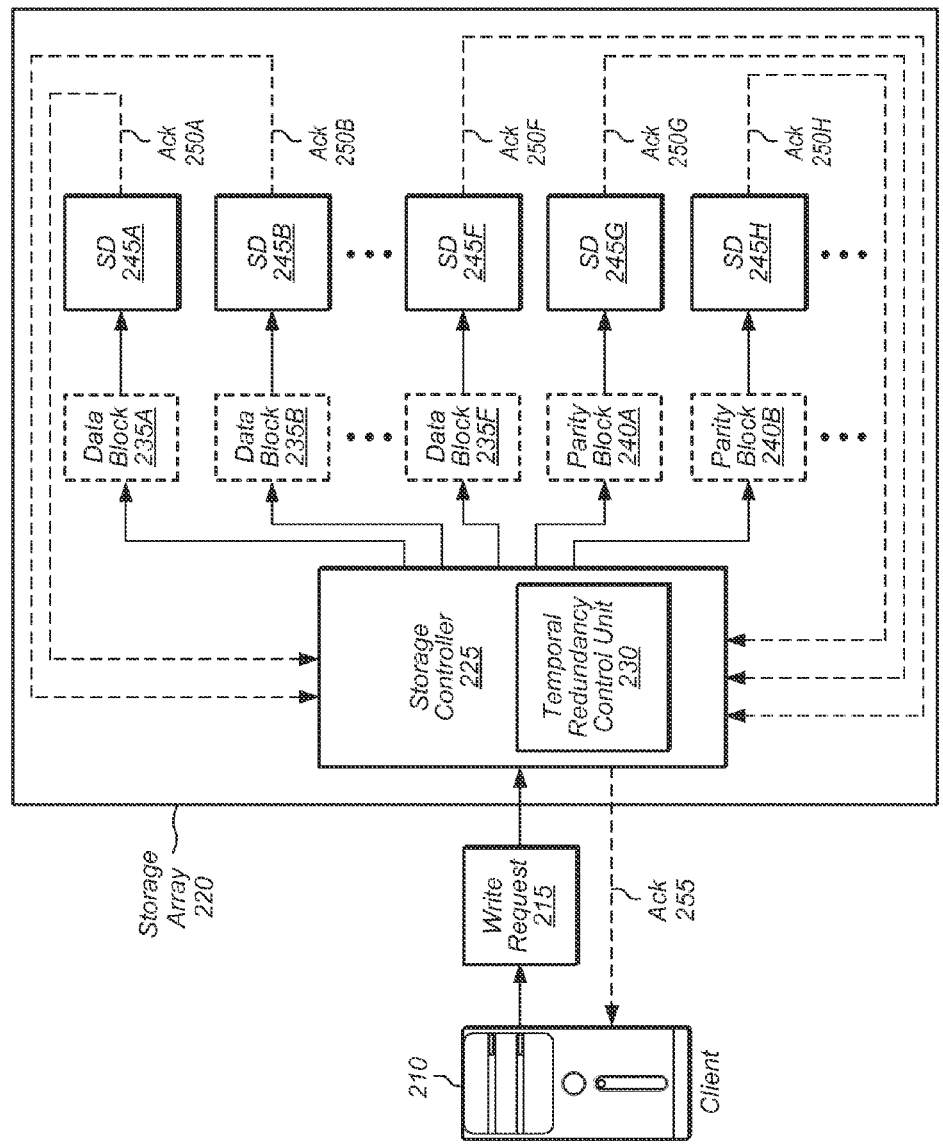
FIG. 2 is a block diagram illustrating one embodiment of a storage array processing a write request.

Turning now to FIG. 2, a block diagram of one embodiment of a storage array 220 processing a write request 215 is shown. Storage array 220 includes storage controller 225 and storage devices 245A-H, which are representative of any number of storage devices. Storage controller 225 includes temporal redundancy control unit 230 which is configured to determine whether to allow early acknowledgments for received write requests.

Client 210 may generate and convey write request 215 to storage array 220. Storage controller 225 may receive the write request 215 and generate the data blocks 235A-F and parity blocks 240A-B corresponding to write request 215. It is noted that data blocks 235A-F are representative of any number of data blocks and parity blocks 240A-B are representative of any number of parity blocks.

In one embodiment, temporal redundancy control unit 230 may determine when to send an acknowledgement (ack) 255 to client 210 based on the status of the writes of data blocks 235A-F and parity blocks 240A-B to their corresponding storage devices 245A-H. Temporal redundancy control unit 230 may also monitor the operating conditions and status of storage array 220 in order to determine whether to send an early acknowledgment for write request 215. For example, temporal redundancy control unit 230 may monitor the number of unacknowledged writes, the number of ongoing rebuild operations, the performance history of storage devices 245A-H, and one or more other conditions. In some cases, storage controller 225 may send an early acknowledgment 255 to client 210 prior to receiving all of the acknowledgments 250A-H from storage devices 245A-H for all data blocks 235A-F and parity blocks 240A-B. In other cases, storage controller may suppress the early acknowledgment and instead may wait until receiving all of the acknowledgments 250A-H from storage devices 245A-H for all data blocks 235A-F and parity blocks 240A-B before sending acknowledgment 255 to client 210.

Figure 3:
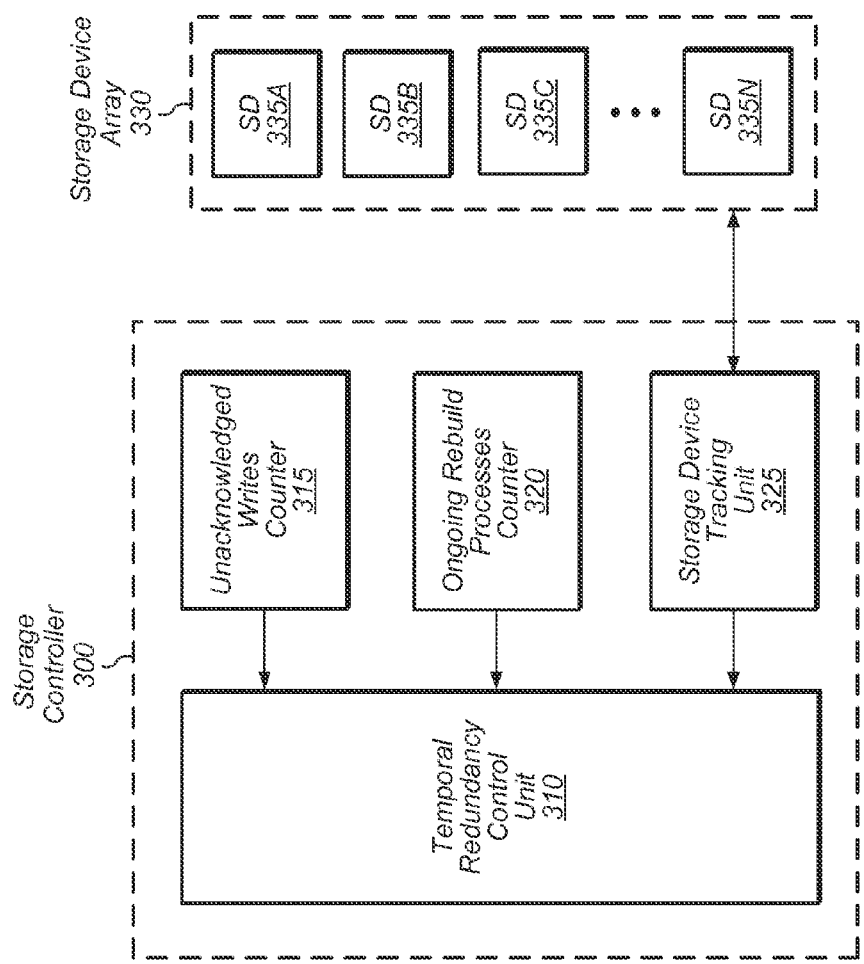
FIG. 3 illustrates one embodiment of a storage controller.

Referring now to FIG. 3, a block diagram of one embodiment of a storage controller 300 is shown. Storage controller 300 may be coupled to storage devices 335A-N of storage array 330. Storage devices 335A-N are representative of any number of storage devices. Storage controller 300 may include temporal redundancy control unit 310, unacknowledged writes counter 315, ongoing rebuild processes counter 320, and storage device tracking unit 325. Unacknowledged writes counter 315 may track the total number of unacknowledged backend writes, which includes any unacknowledged data block writes or parity block writes to storage devices 335A-N for any write requests currently being processed by storage controller 300. Similarly, ongoing rebuild processes counter 320 may track the number of rebuild processes currently being executed by storage controller 300. When storage controller 300 detects that data has been lost or corrupted, a rebuild process may be executed to rebuild the lost data from the available data and parity blocks of the corresponding segment.

Temporal redundancy control unit 310 may be configured to make a determination as to whether an early acknowledgment should be generated for a given write request based on the values of unacknowledged writes counter 315, ongoing rebuild processes counter 320, and the performance history stored in storage device tracking unit 325. Temporal redundancy control unit 310 may be implemented using any combination of hardware and/or software. In other embodiments, temporal redundancy control unit 310 may include additional logic for tracking other metrics associated with the performance of storage controller 300 and storage devices 335A-N. It is also noted that storage controller 300 may also include other logic and components (e.g., network interface, RAM) which are not shown in FIG. 3 for ease of illustration In one embodiment, storage device tracking unit 325 may maintain a table (not shown) with information on the performance history of storage devices 305A-N. Storage device tracking unit 325 may monitor the latency of writes to storage devices 305A-N and utilize the monitored latency to store an indicator in the table for each storage device 305A-N. In one embodiment, storage device tracking unit 325 may store a one-bit indicator for each storage device 305 which indicates if the corresponding storage device 305 is slow or fast. In other embodiments, storage device tracking unit 325 may utilize more than a single bit to represent the performance history of each storage device 305.

When storage controller 300 receives a given write request, temporal redundancy control unit 310 may determine whether or not to allow an early acknowledgment for the given write request. In one embodiment, unit 310 may compare the value of counter 315 to a first threshold and the value of counter 320 to a second threshold. If counter 315 is less than the first threshold and counter 320 is less than the second threshold, then an early acknowledgment may be allowed for the given write request. In another embodiment, unit 310 may compare the sum of the values of counters 315 and 320 to a single threshold and allow an early acknowledgment if the sum is less than the single threshold. In some embodiments, storage controller 300 may issue an early acknowledgment for a given write request if unit 310 has determined an early acknowledgment is allowed and if the only unacknowledged data and/or parity blocks for the given write request are to storage devices deemed "slow" by storage device tracking unit 325. In other embodiments, other techniques for utilizing the values of counters 315 and 320 and the performance history stored in storage device tracking unit 325 may be implemented for determining whether to allow an early acknowledgment.

Unit 310 may also determine how many acknowledgments must be received from storage devices 335A-N before the early acknowledgment is sent to the client which generated the given write request. For example, if a segment is written as seven data blocks and two parity blocks across nine storage devices, an early acknowledgment may be sent after seven blocks are acknowledged, or an early acknowledgment may be sent after eight blocks are acknowledged. For other embodiments, an early acknowledgment may be sent as long as enough blocks have been acknowledged which allow the entire segment to be reconstructed even if the remaining blocks are lost. In some cases, the number of acknowledgments which must be received from storage devices 335A-N before sending the early acknowledgment may be dependent on the values of counters 315 and 320 and on the performance history stored in storage device tracking unit 325.

Figure 4:
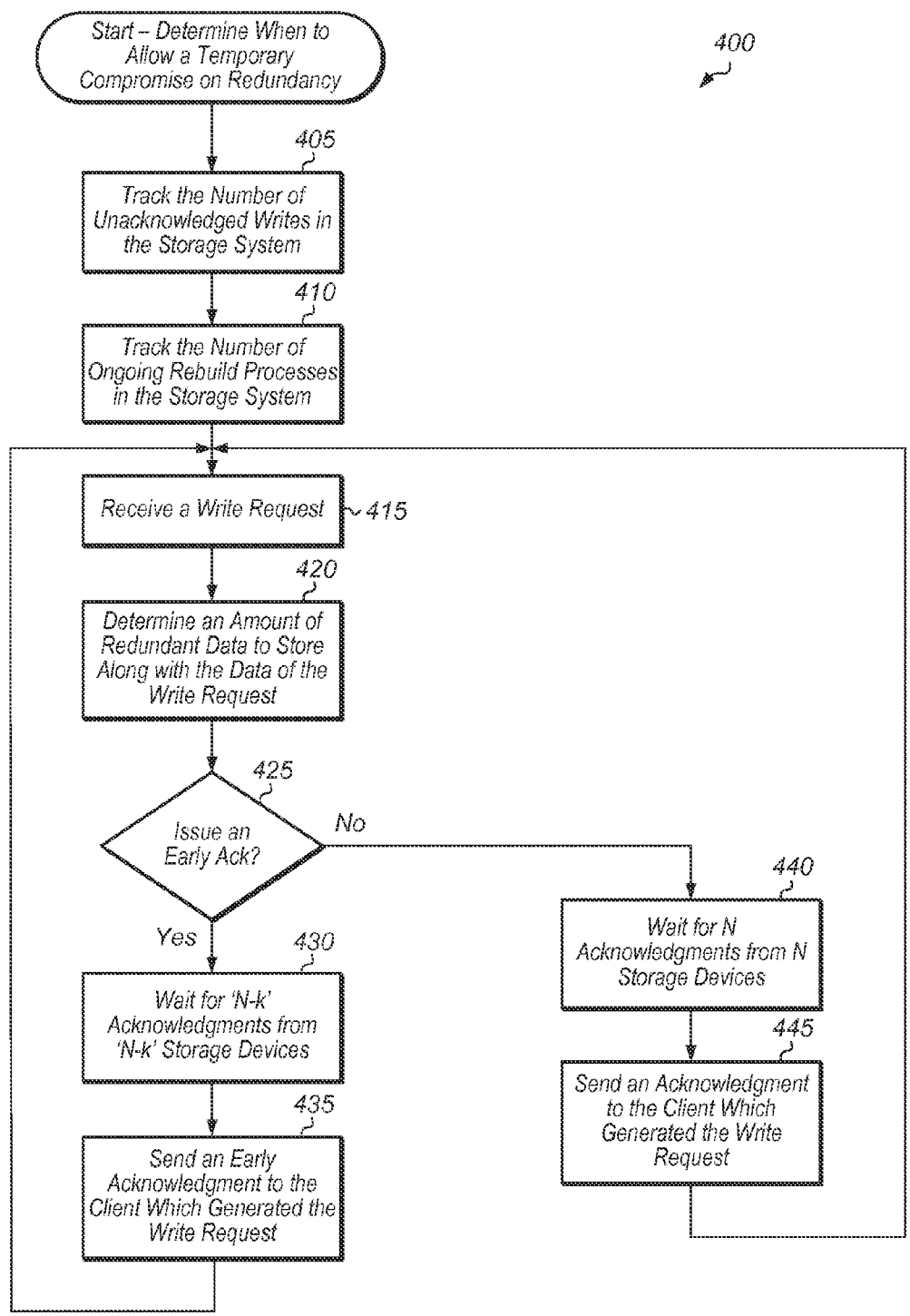
FIG. 4 is a generalized flow diagram illustrating one embodiment of a method for determining when to allow a temporary compromise on redundancy.

Turning now to FIG. 4, one embodiment of a method 400 for determining when to allow a temporary compromise on redundancy is shown. Any of the storage controllers and/or other control logic described throughout this specification may generally operate in accordance with method 400. In addition, the steps in this embodiment are shown in sequential order. However, some steps may occur in a different order than shown, some steps may be performed concurrently, some steps may be combined with other steps, and some steps may be absent in another embodiment.

The number of unacknowledged writes in a storage system may be tracked (block 405). An unacknowledged write is a backend data or parity block write which has not been acknowledged to the storage controller by the storage device to which the data or parity write was sent. Also, a number of ongoing rebuild processes of data or parity blocks in the storage system may be tracked (block 410). Any time a data or parity block needs to be rebuilt due to the loss of the block, a rebuild process may be executed to rebuild this block. For example, the storage system may send an early acknowledgment for a write request to a client before receiving acknowledgments for all of the data and parity blocks associated with the write request. If the storage controller finds out that one or more of the data or parity blocks of this write request were not written to a corresponding storage device and need to be reconstructed, then the storage controller may initiate a rebuild process to rebuild the one or more data or parity blocks. At any given time, the storage controller may have multiple separate ongoing rebuild processes which are currently being executed.

Next, the storage controller may receive a write request (block 415). The write request may be generated by any of the clients connected to the storage system. In response to receiving the write request, the storage controller may determine an amount of redundant parity data to store with the data of the write request (block 420). For example, the storage controller may generate one or more parity blocks corresponding to the one or more data blocks of the write request as a way to introduce redundancy to ensure the write request data can be recovered in the event of a failure of one or more of the storage devices used to store the data and parity blocks. For the purposes of this discussion, it may be assumed that the storage controller has determined to store a total of 'N' data and parity blocks for the write request, wherein 'N' is a positive integer. Next, the storage controller may determine whether to issue an early acknowledgment for the write request based on the current number of unacknowledged writes and on the current number of ongoing rebuild processes (conditional block 425).

In one embodiment, the storage controller may compare the current number of unacknowledged writes to a first threshold and compare the current number of ongoing rebuild processes to a second threshold. If both numbers are below their corresponding thresholds, then the storage controller may issue an early acknowledgment for the write request. In another embodiment, the storage controller may generate a score using a formula which multiplies the current number of unacknowledged writes by a first weighting factor and multiplies the current number of ongoing rebuild processes by a second weighting factor and then takes the sum of these products. This score may be compared to a programmable threshold to determine whether to issue an early acknowledgment. In other embodiments, other techniques utilizing the current number of unacknowledged writes, the current number of ongoing rebuild processes, and/or one or more other metrics to determine if an early acknowledgment should be issued may be implemented.

If the storage controller determines that the current status of the storage system can support an early acknowledgment (conditional block 425, "yes" leg), then the storage controller may wait for 'N−k' acknowledgments from data and parity block writes to 'N−k' storage devices (block 430). The number 'k' is any number such that the value of 'N−k' is sufficient to rebuild any missing 'k' blocks, wherein 'k' is a positive integer. For example, in an embodiment where there are seven data blocks and two parity blocks for a total of nine blocks being written to the storage system for a given write request, 'k' may be either 1 or 2. In one embodiment, the value of 'N−k' (i.e., how soon to send the early acknowledgment) may be determined by the storage controller based on one or more of the previously described metrics. In another embodiment, the value of 'N−k' may be programmable by a user. In a further embodiment, the value of 'N−k' may be fixed.

After receiving 'N−k' acknowledgments from data and parity block writes to 'N−k' storage devices, the storage controller may send an early acknowledgment to the client which generated the write request (block 435). The storage controller may also keep track of the 'k' remaining acknowledgments to determine when they are received. Until those 'k' remaining acknowledgments are received, the write request will be considered an acknowledged but incomplete write request. In some embodiments, the storage controller may keep track of the number of acknowledged but incomplete write requests and utilize this number in block 425 when determining whether to issue an early acknowledgment. After block 435, method 400 may return to block 415 to wait to receive another write request.

If the storage controller determines that the current status of the storage system cannot support an early acknowledgment (conditional block 425, "no" leg), then the storage controller may wait for 'N' acknowledgments from data and parity block writes to 'N' storage devices (block 440). After receiving 'N' acknowledgments from data and parity block writes to 'N' storage devices, the storage controller may send an acknowledgment to the client which generated the write request (block 445). After block 445, method 400 may return to block 415 to wait to receive another write request.

Figure 5:
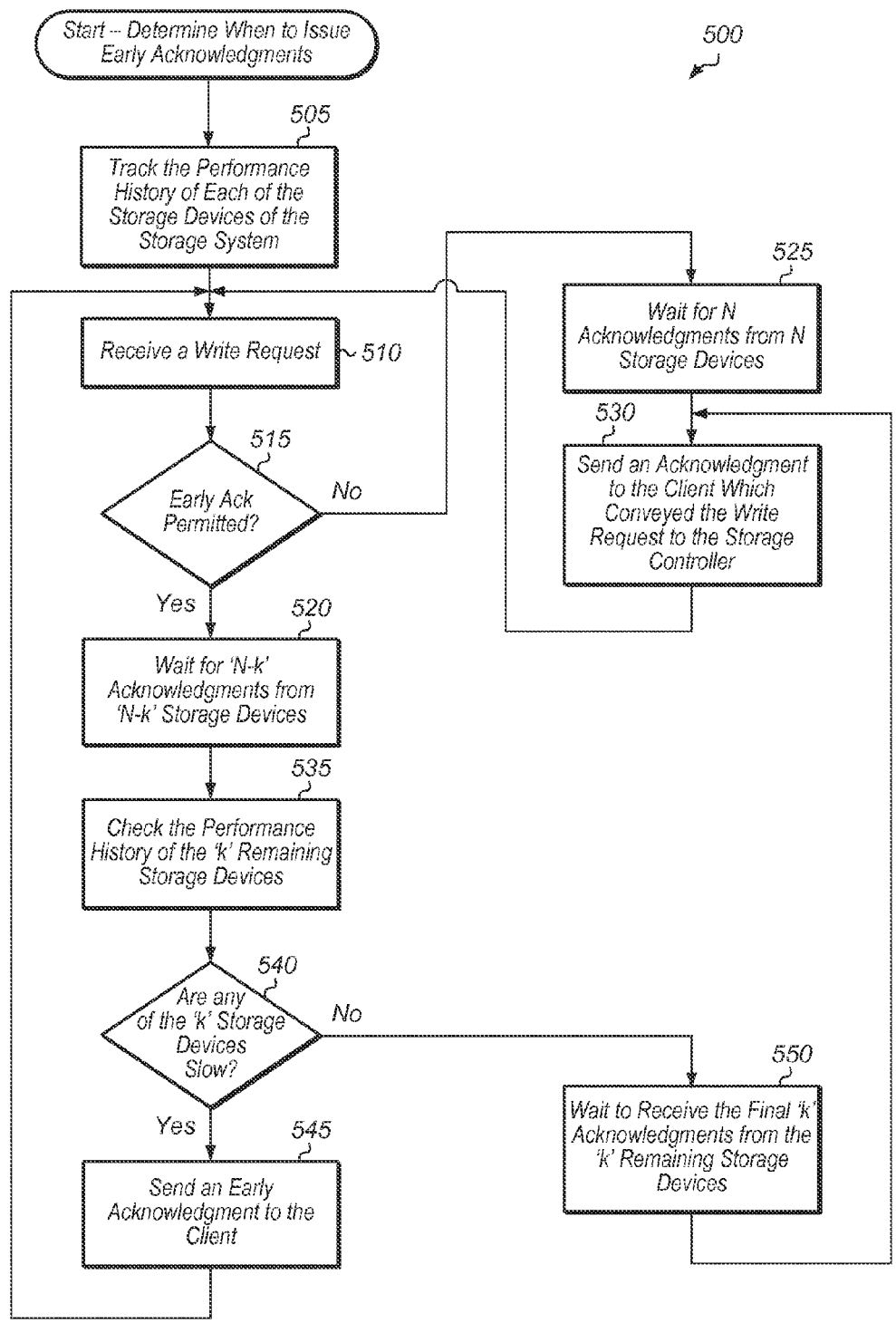
FIG. 5 is a generalized flow diagram illustrating one embodiment of a method for determining when to issue early acknowledgments.

Referring now to FIG. 5, one embodiment of a method 500 for determining when to issue early acknowledgments is shown. Any of the storage controllers and/or other control logic described throughout this specification may generally operate in accordance with method 500. In addition, the steps in this embodiment are shown in sequential order. However, some steps may occur in a different order than shown, some steps may be performed concurrently, some steps may be combined with other steps, and some steps may be absent in another embodiment.

The performance history of each of the plurality of storage devices in the storage system may be tracked (block 505). The performance history may include the typical amount of time required for servicing writes to the storage device. The typical amount of time may be calculated as an average or median amount of time for a plurality of previous writes. In one embodiment, this typical amount of time may be compared to a threshold to determine if the corresponding storage device is "slow" or "fast".

Next, a write request may be received by the storage system (block 510). Then, a determination may be made by the storage controller if an early acknowledgment is permitted for the write request (conditional block 515). The determination may be made based on the operating conditions and status of the storage system. For example, in one embodiment, the determination may be made based on the number of unacknowledged writes and number of ongoing rebuild processes for the storage system. In other embodiments, the determination may be based on these values and/or one or more other factors.

If an early acknowledgment is permitted (conditional block 515, "yes" leg), then the storage controller may wait for 'N−k' acknowledgments from the storage devices for 'N−k' writes of data and parity blocks (block 520). The number 'N' is the number of data and parity blocks which are being written to the storage devices for the write request, wherein 'N' is a positive integer. The number 'k' is any number such that the value of 'N−k' is sufficient to rebuild any missing 'k' blocks, wherein 'k' is a positive integer. For example, in an embodiment where there are seven data blocks and two parity blocks for a total of nine blocks being written to the storage system for a given write request, 'k' may be either 1 or 2.

If an early acknowledgment is not permitted (conditional block 515, "no" leg), then the storage controller may wait for 'N' acknowledgments from the storage devices for 'N' writes of data and parity (block 525). After receiving all 'N' acknowledgments for all of the 'N' writes corresponding to the write request, the storage controller may send an acknowledgment to the client which conveyed the write request to the storage controller (block 530). After block 530, method 500 may return to 510 and wait for another write request to be received.

After block 520, the storage controller may check the performance history of each of the 'k' remaining storage devices which have yet to return an acknowledgment for the 'k' remaining writes of data and/or parity blocks to the storage devices (block 535). If any of the 'k' remaining storage devices has a history of slow performance (conditional block 540, "yes" leg), then the storage controller may not wait for an acknowledgment from these one or more "slow" storage devices and instead may send an early acknowledgment to the client which conveyed the write request to the storage controller (block 545). After block 545, method 500 may return to 510 and wait for another write request to be received.

If none of the 'k' remaining storage devices have a history of slow performance (conditional block 540, "no" leg), then the storage controller may wait to receive the final 'k' acknowledgments from these 'k' remaining storage devices (block 550). After receiving the 'k' acknowledgments from these 'k' remaining storage devices, the storage controller may send an acknowledgment to the client which conveyed the write request to the storage controller (block 530). After block 530, method 500 may return to 510 and wait for another write request to be received.

It is noted that the above-described embodiments may comprise software. In such an embodiment, the program instructions that implement the methods and/or mechanisms may be conveyed or stored on a non-transitory computer readable medium. Numerous types of non-transitory media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

It should be emphasized that the above-described embodiments are only non-limiting examples of implementations. Numerous variations and modifications will become appar-

What is claimed is:

1. A method comprising:
receiving a write request from a client of a storage system, the storage system comprising a plurality of storage devices;
determining that a first condition is satisfied, wherein determining that the first condition is satisfied includes:
detecting that a number of unacknowledged writes of data to storage devices of the plurality of storage devices is below a first threshold; and
detecting that a number of ongoing rebuild processes within the storage system is below a second threshold, wherein the second threshold is different from the first threshold; and
in response to determining that the first condition is satisfied, issuing an early acknowledgement to the client for the write request,
wherein issuing the early acknowledgement comprises sending an acknowledgement of the write request to the client prior to completing all writes of data associated with the write request to the storage system.

2. The method as recited in claim 1, wherein the first threshold and the second threshold are programmable.

3. The method as recited in claim 1 wherein determining that the first condition is satisfied further includes detecting that a weighted sum of the number of unacknowledged writes of data to storage devices and the number of ongoing rebuild processes within the storage system is below a third threshold.

4. The method as recited in claim 1, further comprising:
tracking a performance history of one or more devices of the plurality of storage devices; and
wherein issuing an early acknowledgement to the client for the write request is based at least in part on said performance history.

5. A system comprising:
a plurality of storage devices; and
a storage controller coupled to the plurality of storage devices;
wherein the storage controller is configured to:
receive a write request from a client of a storage system, the storage system comprising a plurality of storage devices;
determine that a first condition is satisfied, wherein determining that the first condition is satisfied includes:
detecting that a number of unacknowledged writes of data to storage devices of the plurality of storage devices is below a first threshold; and
detecting that a number of ongoing rebuild processes within the storage system is below a second threshold, wherein the second threshold is different from the first threshold; and
in response to determining that the first condition is satisfied, issue an early acknowledgement to the client for the write request,
wherein issuing the early acknowledgement comprises sending an acknowledgement of the write request to the client prior to completing all writes of data associated with the write request to the storage system.

6. The system as recited in claim 5, wherein the threshold and the second threshold are programmable.

7. The system as recited in claim 5 wherein determining that the first condition is satisfied further includes detecting that a weighted sum of the number of unacknowledged writes of data to storage devices and the number of ongoing rebuild processes within the storage system is below a third threshold.

8. The system as recited in claim 5, wherein the storage controller is further configured to:
track a performance history of the plurality of storage devices; and
wherein issuing an early acknowledgement to the client for the write request is based at least in part on said performance history.

9. A non-transitory computer readable storage medium storing program instructions, wherein the program instructions are executable by a processor to:
receive a write request from a client of a storage system, the storage system comprising a plurality of storage devices;
determine that a first condition is satisfied, wherein determining that the first condition is satisfied includes:
detecting that a number of unacknowledged writes of data to storage devices of the plurality of storage devices is below a first threshold; and
detecting that a number of ongoing rebuild processes within the storage system is below a second threshold, wherein the second threshold is different from the first threshold; and
in response to determining that the first condition is satisfied, issue an early acknowledgement to the client for the write request,
wherein issuing the early acknowledgement comprises sending an acknowledgement of the write request to the client prior to completing all writes of the data associated with the write request to the storage system.

10. The non-transitory computer readable storage medium as recited in claim 9, wherein the threshold and the second threshold are programmable.

11. The non-transitory computer readable storage medium as recited in claim 9 wherein determining that the first condition is satisfied further includes detecting that a weighted sum of the number of unacknowledged writes of data to storage devices and the number of ongoing rebuild processes within the storage system is below a third threshold.

* * * * *